(12) United States Patent
Umemoto

(10) Patent No.: US 6,961,180 B2
(45) Date of Patent: *Nov. 1, 2005

(54) POLARIZER

(75) Inventor: Seiji Umemoto, Osaka (JP)

(73) Assignee: Nitto Denko Corporation, Osaka (JP)

( * ) Notice: Subject to any disclaimer, the term of this patent is extended or adjusted under 35 U.S.C. 154(b) by 539 days.

This patent is subject to a terminal disclaimer.

(21) Appl. No.: 09/986,432

(22) Filed: Nov. 8, 2001

(65) Prior Publication Data
US 2002/0089748 A1 Jul. 11, 2002

(30) Foreign Application Priority Data
Nov. 8, 2000 (JP) .................................. P2000-340416

(51) Int. Cl.$^7$ ............................ G02B 27/28; G02B 5/30
(52) U.S. Cl. ........................ 359/497; 359/485; 349/119
(58) Field of Search ................................. 359/497, 485, 359/501, 73; 349/119–120

(56) References Cited

U.S. PATENT DOCUMENTS

| 2,441,049 A | 5/1948 | West |
| 5,087,985 A | 2/1992 | Kitaura et al. |
| 5,227,903 A | 7/1993 | Miyazawa et al. |
| 5,594,568 A | 1/1997 | Abileah et al. |

FOREIGN PATENT DOCUMENTS

| EP | 0 350 075 A2 | 1/1990 | |
| JP | 4-305602 | 10/1992 | ............ G02B/5/30 |
| JP | 4-371903 | 12/1992 | ............ G02B/5/30 |
| JP | 3165168 | 3/2001 | ............ G02B/5/30 |
| JP | 3165178 | 3/2001 | ............ G02B/5/30 |

OTHER PUBLICATIONS

Patent Abstract of Japan 04–305602, Oct. 28, 1992.
Patent Abstract of Japan 04–371903, Dec. 24, 1992.

Primary Examiner—Leonidas Boutsikaris
(74) Attorney, Agent, or Firm—Sughrue Mion, PLLC

(57) ABSTRACT

There is provided a polarizer constituted by: a polarizing element; and at least one transparent protective film constituted by two layers of retardation films with an in-plane retardation in a range of from 190 to 320 nm with respect to light having a wavelength of 550 nm, the transparent protective film being bonded onto one of opposite surfaces of the polarizing element so that a slow axis of each of the retardation films is parallel with an absorption axis of the polarizing element, the two layers of retardation films being constituted by a combination of a retardation film with Nz of from 0.65 to 0.85 and a retardation film with Nz of from 0.15 to 0.35 on the condition of nx>ny and Nz=(nx−nz)/(nx−ny) in which nx and ny are in-plane refractive indices of each of the retardation films respectively, and nz is a refractive index in a direction of thickness of each of the retardation films.

4 Claims, 3 Drawing Sheets

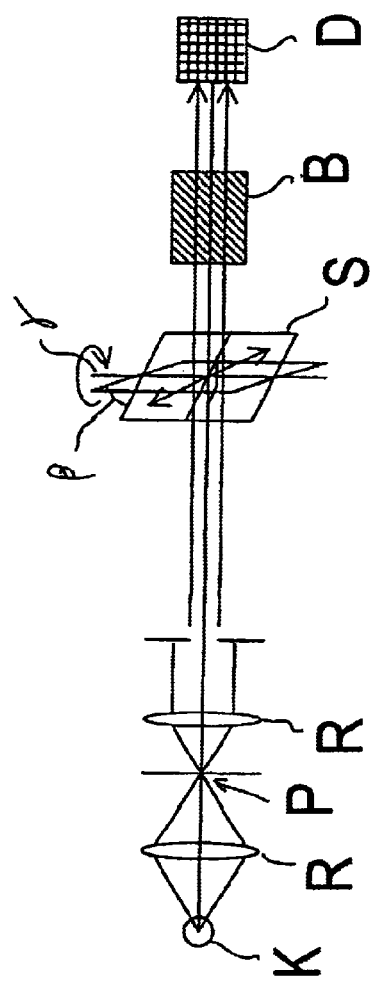

POLARIZER

BACKGROUND OF THE INVENTION

1. Field of the Invention

The present invention relates to a polarizer by which light leakage based on changes of polarizing element axes caused by a change of a viewing angle between polarizing elements disposed in the form of crossed-Nicol can be prevented in a wide range of the visible light to there by achieve liquid-crystal display of a wide viewing angle, or the like.

The present application is based on Japanese Patent Application No. 2000-340416, which is incorporated herein by reference.

2. Description of the Related Art

In polarizing elements disposed in the form of crossed-Nicol, there was a problem that light leakage might occur when the azimuth was changed to an oblique one even in the case where the light could be cut off normally in a normal-line (frontal) direction. This was because the relationship in crossed-Nicol optical axis is displaced or collapsed between the polarizing elements due to the change of the apparent angle caused by the oblique view. As a background-art device to solve the light leakage problem caused by such an azimuth angle, there was known a polarizer in which a transparent protective film exhibiting birefringence with a retardation of from 190 to 320 nm and with Nz (which will be described later) of from 0.1 to 0.9 was disposed so that the slow axis of the transparent protective film is parallel with the absorption axis of a polarizing element (see Unexamined Japanese Patent Publication No. Hei. 4-305602).

The background-art polarizer was provided to compensate for the displacement in absorption axis or the like between polarizing elements due to the change of the viewing angle as follows. As a transparent protective film to be bonded to one or each of opposite surfaces of a polarizing element for improving durability against penetration of moisture or the like, a film exhibiting retardation characteristic of about a half wavelength with respect to visible light was used instead of an isotropic transparent protective film constituted by a triacetylcellulose (TAC) film or the like exhibiting little birefringence which had been generated otherwise. There was, however, a problem that the compensating measure could not cope with wavelength dispersion.

That is, wavelength dispersion, which is a phenomenon that the retardation varies in accordance with the wavelength, generally occurs in a retardation film. Hence, the function of the retardation film as a half-wave plate works only for light with a specific wavelength. For light with the other wavelengths, the retardation film cannot function as a half-wave plate accurately, so that the light with the other wavelengths is inferior in the characteristic of linear polarization. There therefore arises a coloring problem. Incidentally, when the characteristic of the retardation film is optimized to compensate for light with a wavelength near to 550 nm exhibiting a maximum value in luminous efficiency, light with the other wavelengths is colored in blue because the condition for the light is displaced from the aforementioned optimizing condition. Hence, when the retardation film is applied to a liquid-crystal display device or the like, the coloring problem reveals itself as a problem in deterioration of neutral characteristic of display.

SUMMARY OF THE INVENTION

An object of the present invention is to develop a polarizer in which light leakage hardly occurs while coloring owing to wavelength dispersion hardly occurs to thereby achieve excellent neutral characteristic even in the case where polarizing elements disposed in the form of crossed-Nicol are obliquely viewed at an azimuth displaced from the optical axis thereof.

According to the present invention, there is provided a polarizer constituted by: a polarizing element; and at least one transparent protective film constituted by two layers of retardation films with an in-plane retardation in a range of from 190 to 320 nm with respect to light having a wavelength of 550 nm, the transparent protective film being bonded onto one of opposite surfaces of the polarizing element so that a slow axis of each of the retardation films is parallel with an absorption axis of the polarizing element, the two layers of retardation films being constituted by a combination of a retardation film with Nz of from 0.65 to 0.85 and a retardation film with Nz of from 0.15 to 0.35 on the condition of nx>ny and Nz=(nx−nz)/(nx−ny) in which nx and ny are in-plane refractive indices of each of the retardation films respectively, and nz is a refractive index in a direction of thickness of each of the retardation films.

According to the present invention, there can be obtained a polarizer which exhibits a compensating function for canceling the change of an optical axis such as an absorption axis of a polarizing element by changing an optical axis such as a slow axis of each of retardation films constituting a transparent protective film in accordance with the change of a viewing angle so that both light leakage and wavelength dispersion of retardation can be suppressed not only at an azimuth parallel with the optical axis of polarizing elements disposed in the form of crossed-Nicol but also at an azimuth displaced from the optical axis to thereby achieve excellent neutral characteristic (colorlessness) and make linear polarization characteristic difficult to change. The use of the polarizer permits the formation of a liquid-crystal display device, or the like, excellent in display quality such as high contrast ratio at a wide viewing angle. In addition, the polarizer is excellent in reduction of thickness and weight because the two layers of retardation films serve as a transparent protective film.

Features and advantages of the invention will be evident from the following detailed description of the preferred embodiments described in conjunction with the attached drawings.

BRIEF DESCRIPTION OF THE DRAWINGS

In the accompanying drawings:

FIG. 3 is an explanatory view showing the measurement of spectroscopic intensity.

DETAILED DESCRIPTION OF THE PREFERRED EMBODIMENTS

Figure 1:
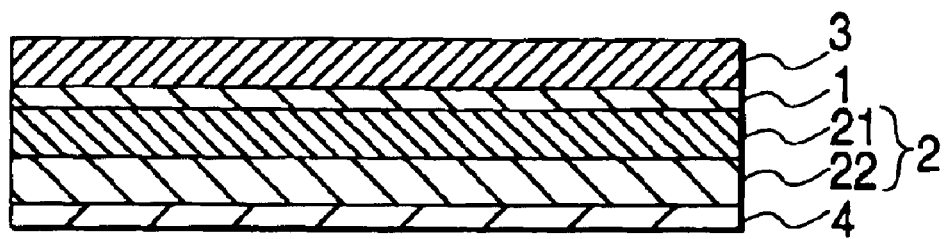
FIG. 1 is an explanatory view showing an embodiment of the present invention.

A polarizer according to the present invention is constituted by: a polarizing element; and at least one transparent protective film constituted by two layers of retardation films with an in-plane retardation in a range of from 190 to 320 nm with respect to light having a wavelength of 550 nm, the transparent protective film being bonded onto one of opposite surfaces of the polarizing element so that a slow axis of each of the retardation films is parallel with an absorption axis of the polarizing element, the two layers of retardation films being constituted by a combination of a retardation film with Nz of from 0.65 to 0.85 and a retardation film with Nz of from 0.15 to 0.35 on the condition of nx>ny and Nz=(nx−nz)/(nx−ny) in which nx and ny are in-plane refractive indices of each of the retardation films respectively, and nz is a refractive index in a direction of thickness of each of the retardation films. FIG. 1 shows an example of the polarizer. In FIG. 1, the polarizer has a polarizing element 1, transparent protective films 2 and 3, and an adhesive agent layer 4. The transparent protective film 2 has two layers constituted by retardation films 21 and 22.

As the polarizing element, it is possible to use a suitable one capable of transmitting linearly polarized light when natural light is made incident on the polarizing element, without any particular limitation. The preferred polarizing element is a polarizing element by which transmitted light excellent in the degree of polarization can be obtained with good light transmittance. From this point of view, it is preferable to use an absorption-dichromatic polarizing element which transmits linearly polarized light while absorbing the other light when natural light is made incident on the polarizing element. Particularly from the point of view of handling properties such as reduction in thickness, flexibility, and so on, the absorption-dichromatic polarizing element is preferably made of a polarizing film. Incidentally, the absorption-dichromatic polarizing element may be constituted by an oriented layer obtained by applying a liquid-crystal dichromatic dye.

As the absorption-dichromatic polarizing element made of a polarizing film, it is also possible to use any suitable one. From the point of view of obtaining linearly polarized light in a wide wave range of the visible light, or the like, it is possible to use a polyvinyl alcohol film made of a polymer such as polyvinyl alcohol or partially formalized polyvinyl alcohol, the film being oriented and aligned after impregnated with iodine or/and a dichromatic dye such as an azo dye, an anthraquinone dye, a tetrazine dye, or the like, by a suitable system such as an adsorption system. Especially, a uniaxially oriented film is preferably used.

As shown in FIG. 1, the transparent protective films 2 and 3 are bonded/laminated onto one or both of opposite surfaces of the polarizing element 1. In the present invention, at least the transparent protective film 2, which is disposed on one of the opposite surfaces of the polarizing element 1, is made of two layers of retardation films 21 and 22 constituted by a combination of a retardation film with Nz of from 0.65 to 0.85 and a retardation film with Nz of from 0.15 to 0.35, each of the retardation films exhibiting an in-plane retardation of from 190 to 320 nm with respect to light having a wavelength of 550 nm. In the above description, Nz is defined by the expression: Nz=(nx−nz)/(nx−ny) on the condition of nx>ny when nx and ny are in-plane refractive indices of each retardation film, and nz is EL refractive index in a direction of the thickness of each retardation film.

In the above description, the two layers of retardation films are bonded/laminated to/on each other so that the slow axis of each of the retardation films is parallel with the absorption axis of the polarizing element. The parallel relationship between the slow axis and the absorption axis does not mean a perfect parallel state in terms of accuracy in working or the like. In terms of the compensating effect, however, the smaller the crossing angle between the two axes is, the more preferable the relationship between the two axes is. In this case, the slow axis of each of the retardation films and the absorption axis of the polarizing element are based on the viewing angle from the front (azimuth angle:

0). The sequence of laminating the retardation films with different Nz can be selected at option. In FIG. 1, the retardation film 22 with Nz of from 0.15 to 0.35 is bonded/laminated onto the polarizing element 1 through the retardation film 21 with Nz of from 0.65 to 0.85. This sequence of arrangement is preferred from the point of view of the compensating effect. Incidentally, the in-plane retardation can be calculated as a product (Δn·d) of the refractive index difference (Δn=nx−ny) and the thickness (d) of each of the retardation films.

For example, each of the retardation films can be obtained as a birefringent film constituted by a polymer film oriented by a suitable system such as a uniaxial orientation system, a biaxial orientation system, or the like. A retardation film excellent in light transmittance and little in alignment unevenness and retardation unevenness is used preferably. A retardation film exhibiting the aforementioned characteristics of retardation and Nz can be formed by a suitable method such as a method in which a heat-shrinkable film is bonded to a polymer film and oriented under the function of shrinking force of the heat-shrinkable film by heating to thereby control the refractive index in the direction of the thickness, a method in which a polymer film is obtained while controlling alignment by applying an electric field in the direction of the thickness and then the film is oriented, or the like. In this case, the retardation and Nz can be changed by changing the kind of polymer or the orientation condition of the film to be processed, the kind of the heat-shrinkable film, the applied voltage, and so on. Incidentally, in a general orientation process such as a uniaxial orientation process, Nz is set to be not larger than 0 or not smaller than 1.

As the polymer forming the retardation film, it is possible to use a suitable one without any particular limitation. Especially, a polymer excellent in transparency is preferred. From the point of view of suppressing the change of the retardation caused by the generation of stress, a polymer with a small photoelastic coefficient is preferred. Incidentally, examples of the preferred polymer include: polycarbonate; polyallylate; polysulfone; polyolefin such as polypropylene; polyester such as polyethylene terephthalate or polyethylene naphthalate; vinyl alcohol polymer; norbornene polymer; acrylic polymer; styrene polymer; cellulose polymer; mixture polymer of two kinds or three or more kinds of the aforementioned polymers; and so on.

The bonding/lamination of the polarizing element onto the transparent protective film or onto the retardation film as one of constituent members of the transparent protective film is provided for the purposes of: improving the protecting effect; preventing the optical axis from being displaced; preventing foreign matter such as dust or the like from entering the polarizing element; and so on. For example, the bonding/lamination can be performed by a suitable system such as a bonding system using a transparent adhesive layer or the like. The adhesive agent used in the system is not particularly limited. From the point of view of preventing the respective optical characteristics of the polarizing element and the transparent protective film from changing, an adhesive agent not requiring any high-temperature process at the time of curing/drying is preferred and an adhesive agent not requiring any long-term curing process or any long-term drying time is preferred. From this point of view, a polyvinyl alcohol adhesive agent or a tackiness agent can be used preferably. Incidentally, the adhesive layer for bonding the retardation film and the polarizing element to each other is not shown in FIG. 1.

As the tackiness agent, it is possible to use one that is formed from a suitable polymer such as acrylic polymer, silicone polymer, polyester, polyurethane, polyether, synthetic rubber, or the like. Especially, an acrylic tackiness agent is preferred from the point of view of optical transparency, tackiness, weather resistance, and so on. Incidentally, as shown in FIG. 1, the adhesive layer 4, especially the tacky layer, may be provided on one or each of opposite surfaces of the polarizer for the purpose of bonding the polarizer onto a subject to be bonded such as a liquid-crystal cell or the like, as occasion demands. In this case, in order to prevent the surface of the tacky layer from being contaminated, preferably, a separator or the like may be temporarily attached to the tacky layer until the surface of the tacky layer is exposed to the outside and put into practical use.

Incidentally, as shown in FIG. 1, such transparent protective films provided for suitable purposes such as improvement in reinforcement, heat resistance, humidity resistance, or the like, may be disposed on opposite surfaces of the polarizing element 1 as occasion demands. In this case, one of the transparent protective films may be formed, in accordance with the background art, as a coating layer of a suitable resin such as TAC or a layer of a laminate of resin films when the transparent protective film is not made of the aforementioned retardation film.

The transparent protective layer provided in the aforementioned case, preferably, has a retardation as small as possible in order to maintain the above-mentioned compensating effect. If there is some retardation, it is preferable that Nz is 0 or 1 or near 0 or 1. The transparent protective layer with Nz of 0 or near 0 is preferably provided so that a fast axis of the layer is parallel with the absorption axis of the polarizing element. The transparent protective layer with Nz of 1 or near 1 is preferably provided so that the slow axis of the layer is parallel with the absorption axis of the polarizing element.

Figure 2A:
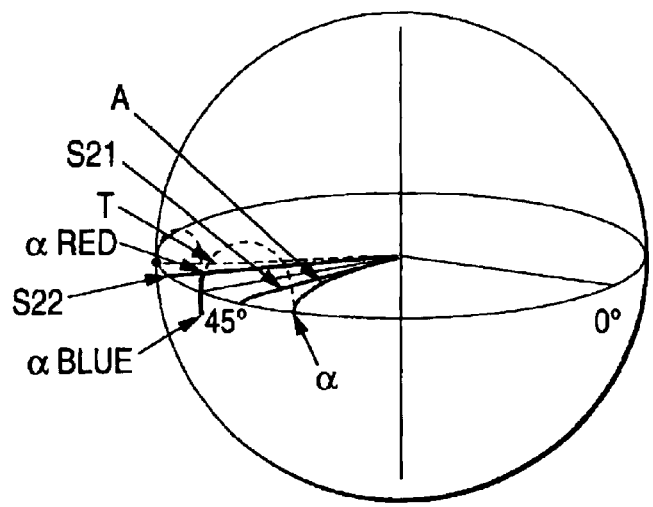
FIGS. 2A to 2C are schematic views each explaining a state in which the axis of the polarizer is displaced in accordance with the change of the viewing angle.
Figure 2B:
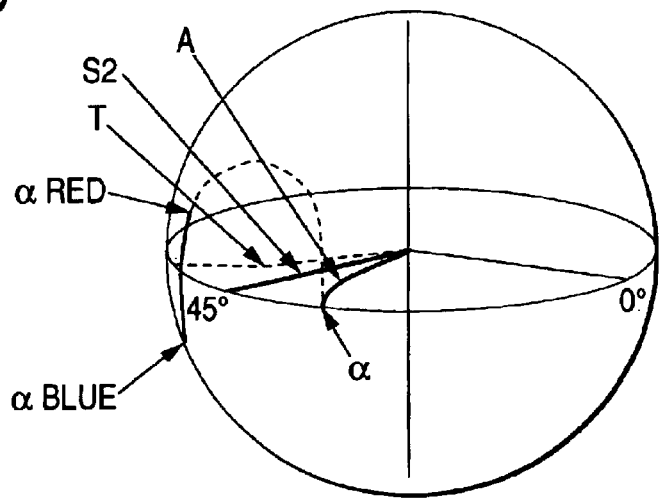
Figure 2C:
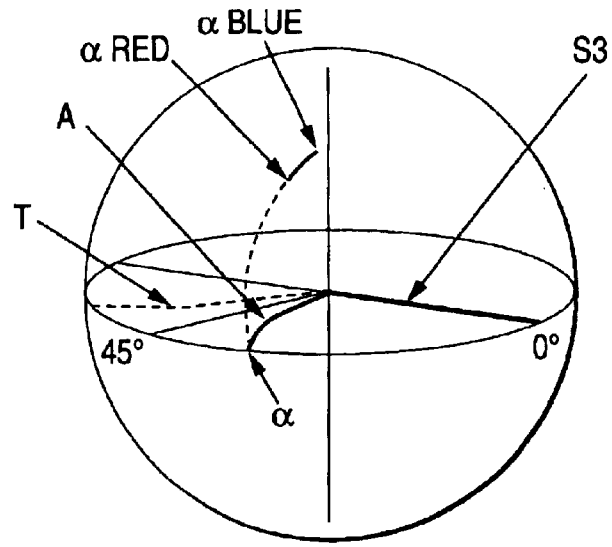

In order to make a comparison between the present invention and the background art, FIGS. 2A to 2C are schematic views each using a Poincare sphere for showing a state of displacement of the axis of the polarizer owing to the change of the viewing angle. FIG. 2A shows the polarizer according to the present invention. FIGS. 2B and 2C show the background-art polarizers, respectively. That is, FIG. 2B shows the polarizer according to Unexamined Japanese Patent Publication No. Hei. 4-305602, in which a transparent protective film exhibiting birefringence with a retardation of from 190 to 320 nm and with Nz of from 0.1 to 0.9 is disposed so that the slow axis of the transparent protective film is parallel with the absorption axis of a polarizing element. FIG. 2C shows the polarizer in which a film having an in-plane retardation not larger than about 30 nm and having Nz in a range of from 1 to 30 is used as the transparent protective film.

In the Poincare sphere, the radius expresses a viewing angle. The thick line shows a state in which the apparent angle of the optical axis changes in accordance with the change of the viewing angle viewed from the direction of zero degree on the condition that the absorption axis A of the polarizing element is arranged at 45 degrees. Incidentally, the change of the optical axis is larger than the real change for explanation's sake. Although FIGS. 2A to 2C show the absorption axis A of the polarizing element and the slow axis S of each retardation film (transparent protective film), the relationship between the transmission axis of the polarizing element and the fast axis of the retardation film also changes in the same manner as in FIGS. 2A to 2C because the transmission axis and the absorption axis of the polarizing element always form a perpendicularly crossing state and the fast axis and the slow axis of the retardation film always form a perpendicularly crossing state.

In each of FIGS. 2A to 2C, the absorption axis A of the polarizing element changes to become gradually parallel with the viewing angle in accordance with the change of the viewing angle. That is, the angle of the absorption axis A in each of FIGS. 2A to 2C changes largely from its original angle. Further, the transmission axis T (broken line) parallel with the absorption axis A in the case where another polarizing element is disposed on the retardation film side of the polarizer in the form of crossed-Nicol, changes in a direction reverse to the absorption axis A in accordance with the change of the viewing angle, and the displacement in angle between the transmission axis T and the absorption axis A increases gradually. The cases in FIGS. 2A and 2C show the same changes as described above.

On the other hand, in the background art shown in FIG. 2C, the angle of the slow axis S3 of the transparent protective film can be regarded as zero degree because the slow axis S3 is generated always approximately horizontally with respect to the viewing angle in accordance with the change of the viewing angle. Moreover, the retardation gradually increases in accordance with the change of the viewing angle. When, for example, the maximum value of the retardation is about 40 nm, light α transmitted through the polarizing element is subjected to rotational transformation with the slow axis S3 as its center on the Poincare sphere. At this time, the magnitude of the function varies in accordance with the wavelength of the light, so that the rotational speed of the light increases as the wavelength of the light decreases (wavelength dispersion). As a result, the light α broadens from αblue to αred as shown in FIG. 2C. Hence, the relation between the absorption axis A and the transmission axis T between the crossed Nicols, which is supposed to be a parallel relation, collapses. In addition, the transmittance of the light transmitted through the polarizing element of the transmission axis T is also influenced by the retardation caused by the transparent protective film so that the transmittance of the light increases (light leakage)

On the other hand, in the background art shown in FIG. 2B, the angle hardly changes when Nz of the slow axis S2 of the transparent protective film takes a value which is in a range of from 0.1 to 0.9 and which is in the vicinity of 0.5 (0.5 in FIG. 2B). In FIG. 2B, the axial change of the slow axis S2 due to the viewing angle hardly occurs. In this case, the influence of the retardation does not appear because the optical axis of the transparent protective film coincides with that of the polarizing element in the frontal direction, but the influence of the retardation appears when the optical axis of the transparent protective film and the optical axis of the polarizing element are displaced from each other.

In the background art shown in FIG. 2B, the in-plane retardation is equal to about a half wavelength of visible light. Hence, as shown in FIG. 2B, light α transmitted through the polarizing element is subjected to rotational transformation by π with the slow axis S2 as its center on the Poincare sphere, so that the light α is transformed into a position substantially symmetrical with the absorption axis A about the slow axis S2. As a result of the transformation, the light α approximately becomes the linearly polarized light at an angle near the angle changed in accordance with the change of the transmission axis T of the polarizing element disposed in the form of crossed-Nicol, so that the light α is compensated for to maintain the relation of crossed-Nicol. As a result, the light leakage is reduced remarkably.

However, in the above-mentioned case, light with a shorter wavelength rotates more rapidly because of wavelength dispersion in the same manner as in FIG. 2C. Hence, the light broadens from αblue to αred as shown in FIG. 2B. In the case where the retardation caused by the transparent protective film is set so as to be equal to a half wavelength with respect to the light with a wavelength of 550 nm, rotational transformation by π is generated so that the retardation with respect to the light with a wavelength of 550 nm is compensated for. On the other hand, with respect to light having a wavelength other than 550 nm, the retardation is displaced from a half wavelength, so that the angle of the rotational transformation formed thus cannot be exactly π but to be larger or smaller thanπ. As a result, the resulting light is displaced from the angle changed in accordance with the change of the transmission axis T of the polarizing element disposed in the form of crossed-Nicol, or the elliptically polarized light. The light is transmitted through the polarizing element of the transmission axis T, so that light leakage in blue or red occurs as shown in FIG. 2C to thereby result in increase in the perpendicularly crossing transmittance or to thereby cause coloring.

On the contrary, as shown in FIG. 2A, the slow axis S21 of the retardation film 21 as one of constituent members of the transparent protective film 2 in the polarizer according to the present invention changes by an angle in the vicinity of a half of the difference between its original angle and the changed angle of the absorption axis A because Nz of the retardation film is in a range of from 0.65 to 0.85 (0.75 in FIG. 2A). Hence, as shown in FIG. 2A, the change of the axis owing to the viewing angle always becomes about ½ as large as the change of the absorption axis A. Further, in this case, the influence of the retardation appears along with the axial displacement between the retardation film 21 and the polarizing element in the same manner as in FIG. 2B. Hence, light α transmitted through the polarizing element is subjected to rotational transformation by π with the slow axis S21 as its center on the Poincare sphere. As a result, the light broadens from αblue to αred because of wavelength dispersion. At the same time, the light is compensated for to be near the linearly polarzied light having an angle changed duo to the viewing angle so as to be substantially equal to the original angle of the absorption axis A, so that the light is made incident on the next retardation film 22 as the other of constituent members of the transparent protective film.

Because Nz of the retardation film 22 is in a range of from 0.15 to 0.35 (0.25 in FIG. 2A), the slow axis S22 of the retardation film 22 is displaced to an axis symmetrical with the changed slow axis S21. In FIG. 2A, the slow axis S22 of the retardation film 22 having Nz to be 0.25 is changed symmetrically with the change of the slow axis S21 of the retardation film 21 having Nz to be 0.75, so that the slow axis S22 is changed, relative to the absorption axis A, to be ½ as large as the change in angle of the transmission axis T of the polarizing element disposed in the form of crossed-Nicol.

In the above-mentioned case, the light αblue to αred subjected to rotational transformation in the retardation film 21 is further subjected to rotational transformation by π with the slow axis S22 as its center on the Poincare sphere. Hence, the light broadens from αblue to αred because of wavelength dispersion. The change in this case, however, has a function for canceling the previous change. Hence, the light is compensated for so as to converge at an angle substantially equal to the transmission axis T of the polarizing element disposed in the form of crossed-Nicol regardless of the wavelength as shown in FIG. 2A. Hence, the relation of cross-Nicol can be maintained with respect to the substantially whole range of wavelength. For example, even in the case where the central wavelength is 550 nm, light leakage in blue or red is prevented so that coloring of the transmitted light is prevented.

The polarizer according to the present invention can be used preferably for the suitable purpose in accordance with the background art, for example, for the purpose of forming a liquid-crystal display device or the like. To put the polarizer into practical use, suitable functional layers such as a protective layer for various kinds of purposes, an anti-reflection layer or/and an anti-glare layer for the purpose of preventing surface reflection or the like, a light-diffusing layer, and so on, may be provided on one or both of opposite surfaces of the polarizer. The anti-reflection layer can be formed suitably as a light-coherent film such as a fluorine polymer coat layer, a multilayer metal-deposited film, or the like. The anti-glare layer can be also formed by a suitable system in which, for example, a resin coating layer containing fine particles is applied or a fine roughness structure is provided on a surface by a suitable system such as embossing, sandblasting, etching, or the like, to thereby diffuse surface-reflected light.

Further, the light-diffusing layer can be also formed in the same manner as the anti-glare layer. Incidentally, examples of the fine particles may include inorganic fine particles and organic fine particles with an average particle size of from 0.5 to 20 μm. The inorganic fine particles are made of silica, calcium oxide, alumina, titania, zirconia, tin oxide, indium oxide, cadmium oxide, antimony oxide, etc. and may be electrically conductive. The organic fine particles are made of suitably crosslinked or non-crosslinked polymers such as polymethyl methacrylate and polyurethane. One member or a combination of two or more members suitably selected from the inorganic fine particles and the organic fine particles may be used as the fine particles. Incidentally, the anti-glare layer or the light-diffusing layer may be formed to be integrated with the transparent protective film by diffusion, surface-roughening, or the like, of the transparent protective film.

On the other hand, the liquid-crystal display device can be formed by use of the polarizer according to the present invention instead of the background-art polarizer and by disposing the polarizer on one or each of opposite sides of the liquid-crystal cell. In this case, it is preferable, from the point of view of improvement in display quality or the like, that the transparent protective film constituted by two layers of retardation films is disposed so as to be located between the polarizing element and the liquid-crystal cell. However, the location of the transparent protective film is not limited thereto.

REFERENCE EXAMPLE

A polyvinyl alcohol film was immersed in hot water so as to be swollen. Then, the film was dyed in an aqueous solution of iodine/potassium iodide and uniaxially oriented in an aqueous solution of boric acid to thereby obtain a polarizing element. Simplex transmittance, parallel transmittance and cross transmittance of the polarizing element were measured by a spectrophotometer. As a result, the transmittance was 43.5% and the degree of polarization was 99.9%.

EXAMPLE 1

Heat-shrinkable films were bonded to opposite surfaces of a polycarbonate (PC) film through tacky layers respectively. The resulting film was uniaxially oriented under heating to thereby obtain a retardation film A with an in-plane retardation of 268 nm and Nz of 0.74 with respect to light with a wavelength of 550 nm (this rule will apply hereunder). On the other hand, in the same process as described above, a retardation film B with an in-plane retardation of 260 nm and Nz of 0.26 was obtained. Then, a TAC film was bonded to one surface of the polarizing element obtained in Reference Example through a polyvinyl alcohol adhesive agent to thereby form a transparent protective layer. Then, a transparent protective film which was constituted by the retardation film A bonded onto the other surface of the polarizing element through a polyvinyl alcohol adhesive agent, and the retardation film B superposedly bonded onto the retardation film A through an acrylic tacky layer was formed. Thus, a polarizer constituted by the polarizing element and the transparent protective film was obtained. Incidentally, the orientation axis in each of the retardation films served as the slow axis, so that bonding was performed so that the slow axis was parallel with the absorption axis of the polarizing element.

EXAMPLE 2

A polarizer was obtained in the same manner as in Example 1 except that a retardation film A with an in-plane retardation of 265 nm and Nz of 0.82 and a retardation film B with an in-plane retardation of 260 nm and Nz of 0.21 were obtained and used in Example 2.

EXAMPLE 3

A polarizer was obtained in the same manner as in Example 1 except that a retardation film A with an in-plane retardation of 259 nm and Nz of 0.67 and a retardation film B with an in-plane retardation of 262 nm and Nz of 0.32 were obtained and used in Example 3.

Comparative Example 1

A polarizer was obtained in the same manner as in Example 1 except that the transparent protective film constituted by the retardation films A and B was replaced by a transparent protective film constituted by a TAC film with an in-plane retardation of 6 nm and Nz of 8.

Comparative Example 2

A polarizer was obtained in the same manner as in Example 1 except that the retardation film A was replaced by a retardation film with an in-plane retardation of 265 nm and Nz of 1.01. The retardation film was uniaxially oriented under heating without any heat-shrinkable film bonded thereto.

Comparative Example 3

A polarizer was obtained in the same manner as in Example 1 except that a retardation film A with an in-plane retardation of 630 nm and Nz of 0.91 and a retardation film B with an in-plane retardation of 515 nm and Nz of 0.67 were obtained and used in Comparative Example 3.

Comparative Example 4

A polarizer was obtained in the same manner as in Example 1 except that a retardation film A with an in-plane retardation of 263 nm and Nz of 0.41 and a retardation film B with an in-plane retardation of 255 nm and Nz of 0.17 were obtained and used in Comparative Example 4.

Comparative Example 5

A polarizer was obtained in the same manner as in Example 1 except that a retardation film A with an in-plane retardation of 274 nm and Nz of 0.94 and a retardation film B with an in-plane retardation of 277 nm and Nz of 0.92 were obtained and used in Comparative Example 5.

Comparative Example 6

A polarizer was obtained in the same manner as in Example 1 except that the transparent protective film constituted by the retardation films A and B was replaced by a transparent protective film constituted by a retardation film with an in-plane retardation of 260 nm and Nz of 0.75. The retardation film was obtained in the same manner as in Example 1.

Evaluation Test

The spectroscopic intensity in the polarizer obtained in each of Examples 1 to 3 and Comparative Examples 1 to 6 was measured by an apparatus shown in FIG. 3. That is, parallel rays were generated by a combination of a light source K, a pinhole P and lenses R. The parallel rays were made incident onto a sample S constituted by the polarizer obtained in each of Examples 1 to 3 and Comparative Examples 1 to 6. Light transmitted through the sample S passed through a spectroscope B and was received by a detector D, so that the spectroscopic intensity of the light was measured. Incidentally, the sample S is obtained by bonding a transparent protective film side (constituted by retardation films, a retardation film, or the like) of the polarizer onto a surface of a glass plate through a tacky layer so as to make the absorption axis of the polarizer be inclined to the side at an angle of 45 degrees, and by bonding another polarizing element onto the other surface of the glass plate through another tacky layer in the form of crossed-Nicol.

Further, for the measurement, the sample S was mounted onto a rotary stage capable of rotating by β around a rotation axis γ perpendicular to the parallel rays so that the transparent protective film (constituted by the retardation film(s)) of the sample S was disposed on the light source side so as to be perpendicular to the light rays and so that the absorption axis of the polarizing element was formed 45 degrees with respect to the rotation axis γ. Transmittance was calculated from the ratio of the spectroscopic intensity measured as described above to reference spectroscopic intensity. L, a and b were calculated from the transmittance value on the basis of three stimulus values, so that the color difference ΔE0 from a black point was obtained. On the other hand, spectral transmittance was measured in the same manner as described above on the condition that the sample S was rotated by 75 degrees around the rotation axis γ. Hence, the color difference ΔE75 from a black point was obtained. At the same time, the color difference ΔE75-0 was calculated from the color coordinates at the respective rotational angles of 0 degree and 75 degrees on the basis of results of the aforementioned measurement. Incidentally, the reference spectroscopic intensity was based on the spectroscopic intensity of the apparatus in the condition that the sample S was removed from the apparatus shown in FIG. 3.

Results of the above description were shown in the following table.

|  | Rotational Angle of 0 degree | | | | Rotational Angle of 75 degrees | | | | Color Difference |
| --- | --- | --- | --- | --- | --- | --- | --- | --- | --- |
|  | L | a | b | ΔE0 | L | a | b | ΔE75 | ΔE75-0 |
| Example 1 | 2.120 | 1.405 | −1.734 | 3.078 | 2.147 | 1.481 | −2.313 | 3.486 | 0.585 |
| Example 2 | 2.108 | 1.472 | −1.685 | 3.074 | 3.134 | 1.445 | 1.602 | 3.805 | 3.444 |
| Example 3 | 2.071 | 1.478 | −1.239 | 2.830 | 2.788 | 1.5 | −2.943 | 4.323 | 1.849 |
| Comparative Example 1 | 1.998 | 1.523 | −1.121 | 2.751 | 17.42 | 3.755 | 5.398 | 18.620 | 16.891 |
| Comparative Example 2 | 2.152 | 1.448 | −1.387 | 2.941 | 11.25 | 3.889 | 6.443 | 13.535 | 12.249 |
| Comparative Example 3 | 2.588 | 1.914 | −1.652 | 3.618 | 24.9 | 8.335 | 7.462 | 27.298 | 24.942 |
| Comparative Example 4 | 2.082 | 1.397 | −1.505 | 2.924 | 9.833 | 5.005 | −4.316 | 11.848 | 9.000 |
| Comparative Example 5 | 2.045 | 1.618 | −1.540 | 3.028 | 13.9 | 4.11 | −7.645 | 16.387 | 13.565 |
| Comparative Example 6 | 2.176 | 1.362 | −2.326 | 3.464 | 3.492 | 5.318 | −6.862 | 9.357 | 6.161 |

It is apparent from the Table and results of the eye observation that difference was hardly recognized between the color difference ΔE0 from a black point in the frontal direction in each of Examples 1 to 3 and the color difference ΔE0 in each of Comparative Examples 1 to 6 but the color difference ΔE75 in the direction of 75 degrees in each of Examples 1 to 3 was obviously smaller than that in each of Comparative Example 1 showing a general polarizer and Comparative Example 2 showing another kind of polarizer, that is, light leakage was suppressed in Examples 1 to 3. Hence, when Nz was not smaller than 1 as shown in each of Comparative Examples 1 and 2, the compensating effect could not be found. On the other hand, the color difference ΔE75 in Comparative Example 3 was larger than that in each of Comparative Examples 1 and 2. It is apparent that the compensating effect cannot be found also when the retardation exceeds a predetermined value.

On the other hand, in Comparative Example 4, the compensating effect was smaller and the light leakage was larger in comparison with that in each of Examples 1 to 3. In Comparative Example 5, light leakage was generated to have the same level as that in Comparative Example 1 and the improving effect was not found. Accordingly, it is apparent that the combination of Nz according to the present invention is essential to appearance of the required compensating effect. On the other hand, in Comparative Example 6, the color difference ΔE75 was smaller than that in Comparative Example 1 but the values of a and b were large so that transmitted light was discolored in violet even in eye observation. This means that optimal compensation was not made for the blue or red region. It was confirmed that the color difference ΔE gradually increased and discoloring (light leakage) gradually increased even in eye observation as the rotational angle increased within a range between 0 degree and 75 degrees.

On the contrary, in Examples 1 to 3, the color of transmitted light was substantially near to an achromatic color and the values of a and b were smaller than those in Comparative Example 6. It is apparent that the compensating effect was achieved in a wide range of the visible light in Examples 1 to 3. Further, in terms of the angle of the sample, 45 degrees were the maximum value. If the angle was larger than 45 degrees, light leakage reduced gradually. Even in this case, remarkable compensating effect was exhibited in each of Examples 1 to 3, while no compensating effect was generated in each of the Comparative Examples 1 to 6. It is apparent from the above description that a polarizer capable of preventing light leakage owing to the change of the viewing angle in a wide range of the visible light can be obtained according to the present invention.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A polarizer comprising:
    a polarizing element; and
    at least one transparent protective film constituted by two layers of retardation films with an in-plane retardation in a range of from 190 to 320 nm with respect to light having a wavelength of 550 nm, said transparent protective film being bonded onto one of opposite surfaces of said polarizing element, wherein a slow axis of each of said retardation films is parallel with the absorption axis of said polarizing element, said two layers of retardation films being constituted by a combination of a retardation film with Nz of from 0.65 to 0.85 and a retardation film with Nz of from 0.15 to 0.35 on the condition of $nx > ny$ and $Nz = (nx-nz)/(nx-ny)$ in which nx and ny are in-plane refractive indices of each of said retardation films respectively, and nz is a refractive index in a direction of thickness of each of said retardation films.

2. A polarizer according to claim 1, wherein said retardation film with Nz of from 0.65 to 0.85 is disposed on a polarizing element side.

3. A polarizer according to claim 1, wherein said polarizing element is absorption-dichromatic.

4. A polarizer according to claim 3, wherein said absorption-dichromatic polarizing element is made of a uniaxially oriented film of a polyvinyl alcohol compound containing iodine or dichromatic dye.

* * * * *